US009536522B1

(12) United States Patent
Hall et al.

(10) Patent No.: US 9,536,522 B1
(45) Date of Patent: Jan. 3, 2017

(54) TRAINING A NATURAL LANGUAGE PROCESSING MODEL WITH INFORMATION RETRIEVAL MODEL ANNOTATIONS

(71) Applicant: Google Inc., Mountain View, CA (US)

(72) Inventors: Keith Hall, Brooklyn, NY (US); Dipanjan Das, Jersey City, NJ (US); Terry Yang-Hoe Koo, Mountain View, CA (US); Fernando Pereira, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 14/143,011

(22) Filed: Dec. 30, 2013

(51) Int. Cl.
*G10L 15/18* (2013.01)
*G10L 15/22* (2006.01)
*G10L 15/06* (2013.01)
*G06F 17/30* (2006.01)

(52) U.S. Cl.
CPC ............. *G10L 15/18* (2013.01); *G10L 15/063* (2013.01); *G06F 17/30684* (2013.01); *G10L 15/1822* (2013.01)

(58) Field of Classification Search
CPC .. G06F 17/30684; G10L 15/18; G10L 15/063; G10L 15/1822
See application file for complete search history.

(56) References Cited

U.S. PATENT DOCUMENTS

| | | | |
|---|---|---|---|
| 5,331,556 A * | 7/1994 | Black, Jr. | G06F 17/274 704/9 |
| 5,963,940 A * | 10/1999 | Liddy | G06F 17/30654 |
| 6,601,026 B2 * | 7/2003 | Appelt | G06F 17/30616 704/9 |
| 6,772,150 B1 * | 8/2004 | Whitman | G06F 17/30448 707/721 |
| 6,947,930 B2 * | 9/2005 | Anick | G06F 17/30646 |

(Continued)

OTHER PUBLICATIONS

Ganchev, Kuzman, et al. "Using search-logs to improve query tagging." Proceedings of the 50th Annual Meeting of the Association for Computational Linguistics: Short Papers—vol. 2. Association for Computational Linguistics, 2012.*

(Continued)

*Primary Examiner* — Jialong He
(74) *Attorney, Agent, or Firm* — Middleton Reutlinger

(57) ABSTRACT

Systems and techniques are provided for training a natural language processing model with information retrieval model annotations. A natural language processing model may be trained, through machine learning, using training examples that include part-of-speech tagging and annotations added by an information retrieval model. The natural language processing model may generate part-of-speech, parse-tree, beginning, inside, and outside label, mention chunking, and named-entity recognition predictions with confidence scores for text in the training examples. The information retrieval model annotations and part-of-speech tagging in the training example may be used to determine the accuracy of the predictions, and the natural language processing model may be adjusted. After training, the natural language processing model may be used to make predictions for novel input, such as search queries and potential search results. The search queries and potential search results may have information retrieval model annotations.

15 Claims, 3 Drawing Sheets

(56) References Cited

U.S. PATENT DOCUMENTS

| | | | | |
|---|---|---|---|---|
| 7,930,168 | B2* | 4/2011 | Weng | G10L 15/19 704/1 |
| 2002/0010574 | A1* | 1/2002 | Tsourikov | G06F 17/271 704/9 |
| 2002/0152202 | A1* | 10/2002 | Perro | G06F 17/30663 |
| 2003/0004914 | A1* | 1/2003 | McGreevy | G06F 17/30684 |
| 2003/0212544 | A1* | 11/2003 | Acero | G06F 17/2785 704/9 |
| 2003/0233224 | A1* | 12/2003 | Marchisio | G06F 17/271 704/4 |
| 2004/0243568 | A1* | 12/2004 | Wang | G06F 17/3043 |
| 2005/0027664 | A1* | 2/2005 | Johnson | G06F 17/2827 706/12 |
| 2005/0049852 | A1* | 3/2005 | Chao | G06F 17/2785 704/9 |
| 2005/0216443 | A1* | 9/2005 | Morton | G06F 17/3002 |
| 2006/0080315 | A1* | 4/2006 | Mitchell | G06F 17/30684 |
| 2008/0109212 | A1* | 5/2008 | Witbrock | G06F 17/2785 704/9 |
| 2010/0177956 | A1* | 7/2010 | Cooper | G06K 9/00664 382/159 |
| 2011/0246181 | A1* | 10/2011 | Liang | G06F 17/2775 704/9 |
| 2013/0036114 | A1* | 2/2013 | Wong | G06F 17/30861 707/732 |
| 2013/0046723 | A1* | 2/2013 | Sweeney | G06N 5/02 706/47 |
| 2013/0080152 | A1* | 3/2013 | Brun | G06F 17/30666 704/9 |
| 2014/0163962 | A1* | 6/2014 | Castelli | G06F 17/2715 704/9 |

OTHER PUBLICATIONS

De Bona, Fabio, et al. "Learning dense models of query similarity from user click logs." Human Language Technologies: The 2010 Annual Conference of the North American Chapter of the Association for Computational Linguistics. Association for Computational Linguistics, 2010.*

Robin Good, "Semantic Search With Powerset: Transforming Publications Through Semantic Search Technology", available at http://www.masternewmedia.org/news/2008/05/17/semantic_search_with_powerset_transforming.htm, May 17, 2008.

Ricardo Baeza-Yates et al., "Towards Semantic Search," LDB 2008, LNCS 5039, pp. 4-11, 2008.

Cory Barr et al., "The Linguistic Structure of English Web-Search Queries", Proceedings of EMNLP 2008: Conference on Empirical Methods in Natural Language Processing, 2008.

* cited by examiner

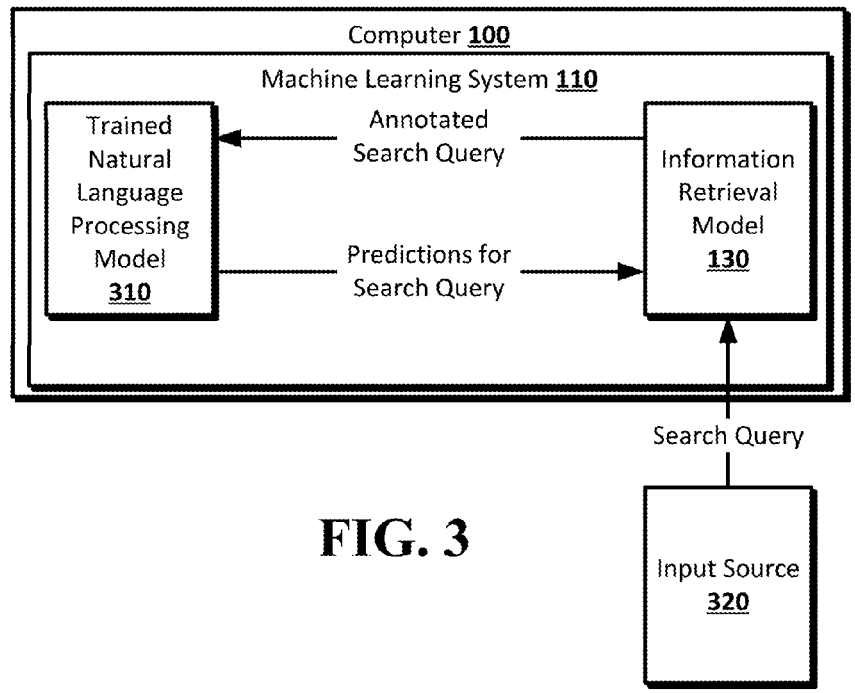
FIG. 3
FIG. 4
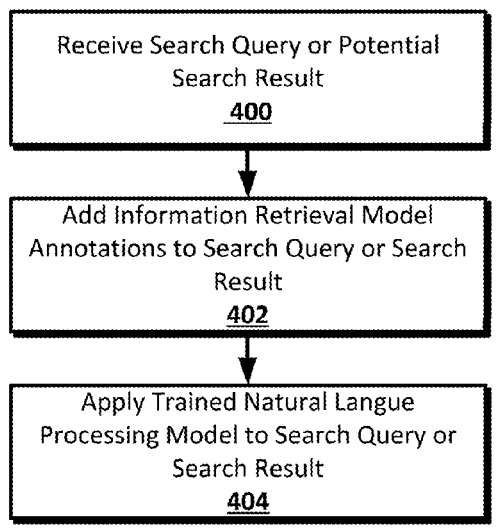

TRAINING A NATURAL LANGUAGE PROCESSING MODEL WITH INFORMATION RETRIEVAL MODEL ANNOTATIONS

BACKGROUND

A natural language processing model may be a machine learning system, or component thereof, used by a computer system to interact with human languages. For example, a natural language processing model may receive a query as input, and may make predictions about the text of the query to help determine what the query is requesting and what information or actions might be relevant responses to the query.

Natural language processing models may be trained using training examples from well-behaved domains. For example, news reports that have been human-annotated with part-of-speech tagging may be training examples used to train a natural language processing model. When a natural language processing model that has been trained on training examples from a well-behaved domain is given input such as search queries and potential search results, which may be, for example, web documents, the results may be much worse than when the natural language processing model is given input similar to the training examples. Search queries may be short, grammatically unsound, and lacking in context. The natural language processing model may have difficulty identifying the part-of-speech of words in a search query, including disambiguating syntactically confusable labels, and determining the syntactic structure of the query. This may reduce the usefulness of natural language processing models in interpreting web documents and responding to search queries. There may be few training examples available with which to train the natural language processing model to interpret search queries.

BRIEF SUMMARY

According to an embodiment of the disclosed subject matter, a training data set including a training example set may be obtained. An information retrieval model annotation may be added to the training example in the training data set to obtain an annotated training data set. A natural language processing model may be trained using the annotated training data set to obtain a trained natural language processing model. The natural language processing model may incorporate an information retrieval model annotation.

The training example may include part-of-speech tagging, and the information retrieval model annotation may relate a word in the training example to one or more of a knowledge graph, a concept graph model, and an entity repository, or identify a word in a training example as one or more of a multi-word expression, a phrase, and a proper name.

A prediction for a word in the training example, and confidence score for the prediction, may be generated by the natural language processing model. The prediction may be, for example, a part-of-speech prediction, a parse-tree prediction, a mention chunking prediction, a beginning, inside, and outside label prediction, or a named entity recognition prediction. The confidence score may be a confidence level of the prediction. A prediction with a confidence score below a threshold may be filtered out.

The information retrieval model annotation incorporated by the natural language processing model may be used by the natural language processing model to evaluate the prediction of the natural language processing model. Part-of-speech tagging in the training examples may also be used by the natural language processing model to evaluate the prediction of the natural language processing model.

A search query or potential search result may be received. An information retrieval model annotation may be added to the search query or potential search result. The trained natural language processing model may be applied to the search query or potential search result to obtain a prediction and a confidence score. The prediction may be, for example, one or more of a part-of-speech prediction, a parse-tree prediction, a mention chunking prediction, a beginning, inside, and outside label prediction, and a named entity recognition prediction. The confidence score may be a confidence level of the prediction.

According to an embodiment of the disclosed subject matter, a means for obtaining a training data set including at least one training example, a means for adding an information retrieval model annotation to a training example in the training data set to obtain an annotated training data set, and a means for training a natural language processing model on the annotated training data set to obtain a trained natural language processing model, where the natural language processing model incorporates an information retrieval model annotation, are included.

A means for generating a prediction for a word in the training example, a means for generating a confidence score for the prediction, a means for filtering out a prediction of the natural language processing model with a confidence score that is below a threshold, a means for receiving a search query or potential search result, a means for adding an information retrieval model annotation to the search query or potential search result, and a means for applying the trained natural language processing model to the search query or potential search result to obtain a prediction and a confidence score, where the prediction may be, for example, one or more of a part-of-speech prediction, a parse-tree prediction, a mention chunking prediction, a beginning, inside, and outside label prediction, and a named entity recognition prediction, and where the confidence score is a confidence level of the prediction, may also be included.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3 shows an example arrangement for using a trained natural language processing model according to an implementation of the disclosed subject matter.

FIG. 4 shows an example process for using a trained natural language processing model according to an implementation of the disclosed subject matter.

DETAILED DESCRIPTION

Figure 1:
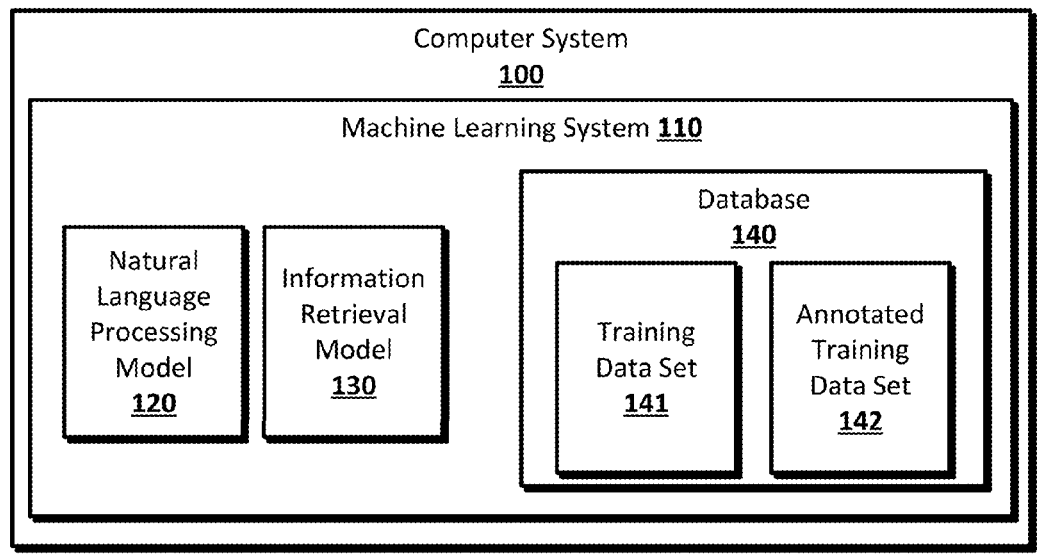
FIG. 1 shows an example system for training a natural language processing model according to an implementation of the disclosed subject matter.

It may be desirable to train a natural language processing model to make better predictions on input from less-well behaved domains, such as, for example, search queries and potential search results such as web documents. Information retrieval models may be used in place of natural language processing models in responding to search queries. The information retrieval models may annotate search queries with information that may be used in the retrieval of information relevant to the search query. The information retrieval model annotations may relate various part of the text of search queries to, for example, a knowledge graph, a concept graph model, and an entity repository, and identify parts of the text as multi-word expressions, phrases, and proper names. As described herein, these information retrieval model annotations may be used to assist in the training of a natural language processing model. For example, the natural language processing model may have difficulty disambiguating verbs and adjectives that are being used as proper nouns in the context of a search query, for example, as the name of television show. Knowledge graph, concept graph, entity repository, and proper names annotations generated by an information retrieval system may help to train the natural language processing to make better predictions regarding such ambiguous words and phrases.

In an implementation, an information retrieval model may be used to provide information retrieval model annotations for training examples that have already been annotated with NLP-type tags, such as part-of-speech tagging. The information retrieval model annotated training examples may be used to train a natural language processing model. For example, the natural language processing model may use the information retrieval model annotations in making predictions about text in a training example, which may train the natural language processing model to use the information retrieval model annotations when making predictions about novel input. As another example, the accuracy of the natural language processing model's part-of-speech predictions may be evaluated against both the part-of-speech tagging and information retrieval model annotations in the training examples during supervised training. The accuracy evaluation may be used to make adjustments to the natural language processing model, resulting in a trained natural language processing model.

After training, the natural language processing model may be used to make predictions for novel input such as search queries and potential search results. The trained natural language processing model may be given input text, such as a search query, that has been annotated by an information retrieval model. The trained natural language processing model may make predictions for the text of the input. Specific examples of such predictions include part-of-speech predictions, parse-tree predictions, mention chunking predictions, beginning, inside, and (BIO) outside label predictions, and named entity recognition predictions. More generally, such a prediction may identify any mention of an entity or concept of interest, and such entities and/or concepts may then be classified into groups of similar meaning. Each prediction may be assigned a confidence score by the trained natural language processing model, and the confidence score for some predictions may be adjusted based on the information retrieval model annotations for the input text.

FIG. 1 shows an example system for training a natural language processing model according to an implementation of the disclosed subject matter. A computer 100 may include a machine learning system 110. The machine learning system 110 may include a natural language processing model 120, an information retrieval model 130, and a database 140. The computer 100 may be any suitable device, such as, for example, a computer 20 as described in FIG. 5, for implementing the machine learning system 110. The computer 100 may be a single computing device, or may include multiple connected computing devices. The natural language processing model 120 may be a part of the machine learning system 110 for making predictions about the linguistic structure of text inputs. The natural language processing model 120 may be implemented as, for example, a Bayesian network, artificial neural network, support vector machine, or any other suitable statistical or heuristic machine learning system type. The information retrieval model 130 may be any suitable model for retrieving information, such as, for example, web documents, related to a search query. The information retrieval model may be implemented in any suitable manner, such as, for example, with statistical or probabilistic models or machine learning systems. The database 140 may store a training data set 141 and an annotated training data set 142.

The training data set 141 may be a collection of training examples used for training natural language processing models. The training examples may be documents that include text and annotations indicating the part-of-speech of the words in the text. This part-of-speech tagging may be added to the training examples by a human. For example, the training examples may be human-annotated news documents or search queries. The annotated training data set 142 may be a collection of training examples that have been annotated by the information retrieval model 130. The information retrieval model 130 may be able to obtain data from the database 140. For example, the information retrieval model 130 may obtain the training data set 141 from the database 140, annotate the training examples in the training data set 141 with information retrieval model annotations, and store the annotated training examples as the annotated training data set 142 in the database 140.

The natural language processing model 120 may also be able to obtain data from the database 140. For example, the natural language processing model 120 may obtain the annotated training data set 142, which may be used to train the natural language processing model 120. The natural language processing model 120 may include features for incorporating the information retrieval model annotations during training. For example, the natural language processing model 120 may include a prediction feature for beginning, inside, and outside labels, which may be used to predict where each type of information retrieval model annotation starts and ends. This may allow the natural language processing model 120 to associate specific part-of-speech tags, for example, noun, verb, and proper noun, with the information retrieval model annotations.

Figure 2:
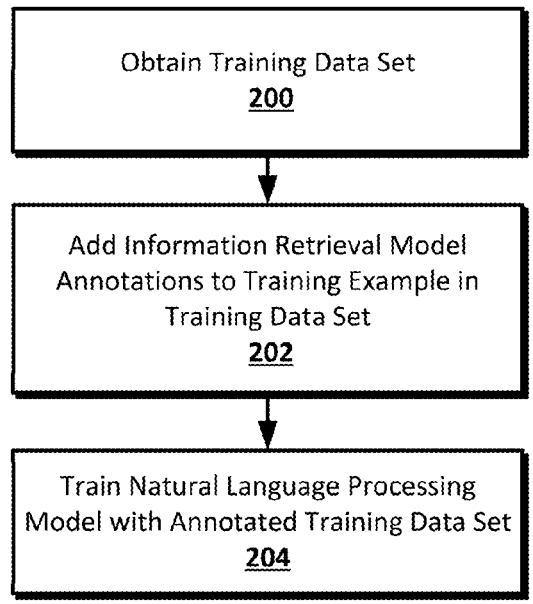
FIG. 2 shows an example process for training a natural language processing model according to an implementation of the disclosed subject matter.

FIG. 2 shows an example process for training a natural language processing model according to an implementation of the disclosed subject matter. At 200, a training data set may be obtained. For example, as previously described, the information retrieval model 130 may obtain the training data set 141 from the database 140.

At 202, information retrieval model annotations may be added to the training data set. For example, the information retrieval model 130 may add information retrieval model annotations to the training examples in the training data set 141 to produce annotated training examples for the annotated training data set 142. The annotated training data set 142 may be stored in the database 140. The information retrieval model annotations may include, for example, annotations linking text to a knowledge graph, a concept graph model, and an entity repository such as an online database or encyclopedia, and annotations identifying parts of the text as multi-word expressions or n-gram concepts, phrases, and proper names. In an implementation, the information retrieval model 130 may also use components of a natural language processing model, including, for example, part-of-speech, tagging, syntactic parsing, mention chunking, and named entity recognition, in annotating the training examples. More generally, any technique for identifying mentions of entities and/or concepts may be used, and such mentions classified into groups of similar meaning. These components may be used separately, such as in part of a query processor in an information retrieval model that identifies parts of speech of a query. Alternatively or in addition, these components may be obtained from an NLP model operating in conjunction with the information retrieval model as disclosed herein. In general, the information retrieval model 130 may use NLP annotations as described to perform document retrieval and/or ranking in response to a query. The NLP signals also may be used, for example, to generate annotations used to train the NLP system.

The training examples in the annotated training data set 142 may include the original text of the training examples with part-of-speech tagging along with predictions as to where the different types of information retrieval model annotations may occur. Each prediction also may be associated with a confidence score indicating a level of confidence in the correctness of a prediction. For example, a phrase in the text of a training example may be annotated as a concept with a 55% confidence score, another phrase in the text may be annotated as being a knowledge graph entity with an 87% confidence score, and a word or phrase may be annotated as a proper name with a 73% confidence score. Parts of the text, such as a word or phrase, may have more than one information retrieval model annotation. Text for a two-word long proper name of a place in an annotated training example may, for example, be identified by part-of-speech tags as a noun and by an information retrieval model annotation as a knowledge graph entity. The first word of the proper name may be identified by an information retrieval model annotation as a beginning.

At 204, a natural language processing model may be trained with the annotated training data set. For example, the annotated training data set 142 may be used to train the natural language processing model 120. The annotated training examples from the annotated training data set 142 may be input into the natural language processing model 120 without the part-of-speech tagging. That natural language processing model 120 may make predictions about the text, incorporating the information retrieval model annotations. The predictions may be, for example, part-of-speech predictions, parse-tree predictions, mention chunking predictions, beginning, inside, and outside label predictions, and named entity recognition predictions as disclosed elsewhere herein. Each prediction made by the natural language processing model 120 may have a confidence score. The natural language processing model 120 may also include functions used during training to make predictions about whether the text has information retrieval model annotations identifying part of the text as a knowledge graph entity.

The predictions made by the natural language processing model 120 about the text of an annotated training example may be compared with the part-speech-tagging and information retrieval model annotations in the annotated training example. The accuracy of the predictions of the natural language processing model 120 may be determined, and adjustments may be made to the natural language processing model 120 in the appropriate manner for the type of supervised or semi-supervised machine learning used by the natural language processing model 120. For example, the predictions made by the natural language processing model 120 for text in a training example may be evaluated against the part-of-speech tagging and the information retrieval model annotations in the training example. Predictions with confidence scores that fall below a threshold may be filtered out and not used to determine the accuracy of the natural language processing model 120 during training.

The natural language processing model 120 may be trained with any number of the annotated training examples from the annotated training data set 142, in any order, and may be trained with the same annotated training example multiple times. The result of training the natural language processing model 120 may be a trained natural language processing model.

FIG. 3 shows an example arrangement for using a trained natural language processing model according to an implementation of the disclosed subject matter. Once the natural language processing model 120 has been trained, the trained natural language processing model 310 may be used to make predictions for novel input. The input to the natural language processing model 120 may be, for example, a search query as depicted in FIG. 3, or a potential search result. Potential search results may be, for example, web documents or web pages, or other suitable documents or file types that include text and may be subject to searching. The input, which may be a target document, may be sent to the information retrieval model 130 from an input source 320, which may be, for example, a computing device on which a user has entered a search query into a web page, or a database containing potential search results for a search query. The information retrieval model 130 may add information retrieval model annotations to the input, and then pass the annotated input to the trained natural language processing model 310. The trained natural language processing model 310 may make predictions about the input, which may be sent back to the information retrieval model 130 for use in information retrieval. The trained natural language processing model 310 may provide better predictions, for example more accurate part-of-speech predictions, with better disambiguation, for use by the information retrieval model 130. This may assist the information retrieval model 130 in finding more relevant search results for a search query, or making more accurate determinations as to the relevance of a potential search to a search query.

FIG. 4 shows an example process for using a trained natural language processing model according to an implementation of the disclosed subject matter. At 400, a search query or potential search result may be received. For example, as depicted in FIG. 3, a search query from the input source 320 may be received at the computer 100 by the information processing model 120.

At 402, information retrieval model annotations may be added to the search query or potential search result. For example, as depicted in FIG. 3, the search query may be annotated by the information retrieval model 130. The information retrieval model annotations added to the search query may be the same annotations the information retrieval model 130 uses to perform information retrieval. The information retrieval model annotations may include, for example, annotations linking text to a knowledge graph, a concept graph model, and an entity repository such as an online database or encyclopedia, and annotations identifying parts of the text as multi-word expressions or n-gram concepts, phrases, and proper names.

At 404, the natural language processing model may be applied to the search query or potential search results. For example, as depicted in FIG. 3, after information retrieval model annotations have been added to the search query, the natural language processing model 310 may make predictions for the text of the search query. The predictions made by the trained natural language processing model 310 may include, for example, part-of-speech predictions, parse-tree predictions, mention chunking predictions, beginning, inside, and outside label predictions, and named entity recognition predictions as disclosed elsewhere herein. Each prediction may also include a confidence score. The information retrieval model annotations may be used to increase the confidence scores given to certain predictions. For example, if the trained natural language processing model 310 predicts that a part of the text is a phrase, and the information retrieval model annotations identify the same part of the text as a phrase, the confidence score for that prediction of the natural language processing model 310 may be increased. The trained natural language processing model 310 may also include functions used during training to make predictions about whether the text has information retrieval model annotations identifying part of the text as a knowledge graph entity. As depicted in FIG. 3, once the trained natural language processing model 310 has made predictions for the search query, the predictions may be sent back to the information retrieval model 120, which may use the predictions to assist in retrieving information relevant to the search query.

As previously described, the input from the input source 320 may be a potential search result. The predictions of natural language processing model 320 for a potential search result may be used by the information retrieval model 310 to assist in determining if the potential search result is relevant to a given search query.

In an implementation, a non-machine-learning system may be used in place of the machine-learning based natural language processing model 110 described above. In this implementation, logic or features which make use of the information retrieval model annotations may be added to the non-machine-learning system.

Figure 5:
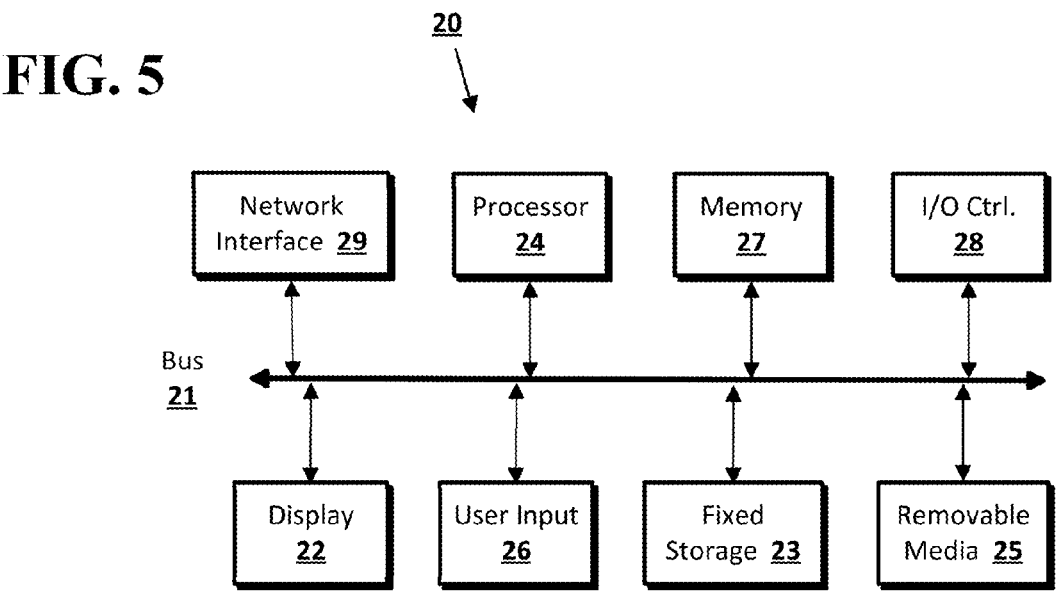
FIG. 5 shows a computer according to an embodiment of the disclosed subject matter.

Embodiments of the presently disclosed subject matter may be implemented in and used with a variety of component and network architectures. FIG. 5 is an example computer 20 suitable for implementing embodiments of the presently disclosed subject matter. For example, the computer 20 may be used to implement the computer 100. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25. For example, the machine learning system 110, including natural language processing model 120 and information retrieval model 130, and the database 140, including the training data set 141 and the annotated training data set 142, may be reside in the fixed storage 23 or the removable media component 25. The natural language processing model 310 may also reside in the fixed storage 23 or removable media component 25, in addition to or in place of the natural language processing model 120.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

Figure 6:
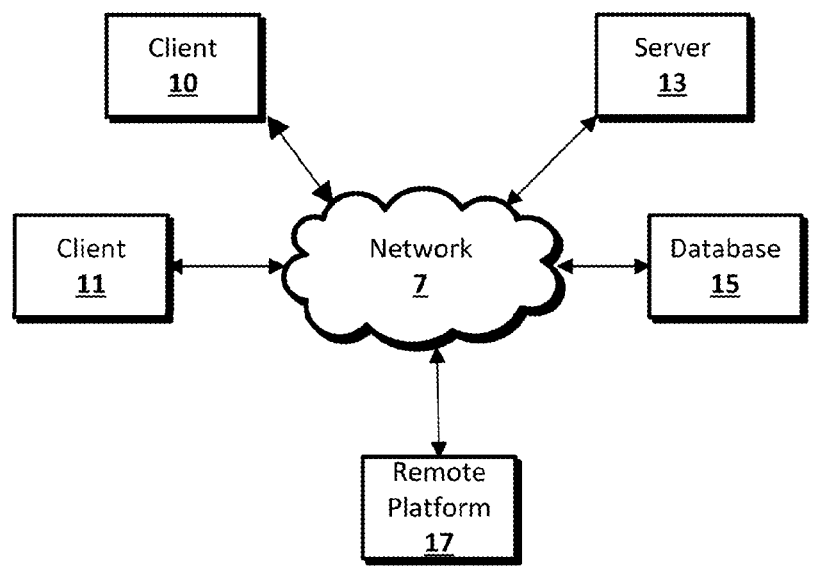
FIG. 6 shows a network configuration according to an embodiment of the disclosed subject matter.

FIG. 6 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/ or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. For example, the computer 100 including the machine learning system 110 may be implemented in a server 13, and the input source 320 may be one of the clients 10, 11, with access to the computer 100 through the network 7.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   obtaining a training data set comprising at least one training example, the at least one training example being annotated with at least one training example natural language processing tag;
   adding a training example information retrieval model annotation to the at least one training example in the training data set to obtain an annotated training data set;
   training a natural language processing model on the annotated training data set to obtain a trained natural language processing model, wherein training comprises training the natural language processing model based on both the training example natural language processing tag and the training example information retrieval model annotation of the at least one training example, and wherein training the natural language processing model further comprises:
      generating a part-of-speech tag for at least one word in the at least one training example,
      generating a confidence score for the part-of-speech tag, and
      filtering out the part-of-speech tag if the confidence score for the part-of-speech tag is below a threshold;
   receiving a search query or a potential search result;
   adding an information retrieval model annotation to the search query or the potential search result;
   applying the trained natural language processing model to the search query or the potential search result to obtain a prediction, wherein applying the trained natural language processing model to obtain the prediction comprises using the information retrieval model annotation added to the search query or the potential search result; and
   using the prediction to retrieve information relevant to the search query or to determine relevance of the potential search result.

2. The computer-implemented method of claim 1, wherein the at least one training example comprises text and wherein the at least one training example natural language processing tag comprises a part-of-speech tag.

3. The computer-implemented method of claim 1, wherein the training example is a training example search query or a training example potential search result.

4. The computer-implemented method of claim 3, wherein the at least one training example comprises the training example search query, and wherein the training example search query is received from a user and wherein the at least one training example natural language processing tag comprises a part-of-speech tag of the training example search query.

5. The computer-implemented method of claim 1, wherein the training example information retrieval model annotation comprises an annotation identifying at least one word as at least one of a multi-word expression, a phrase, and a proper name.

6. The computer-implemented method of claim 1, wherein the training example information retrieval model annotation comprises an annotation used by an information retrieval model for search query analysis.

7. The computer-implemented method of claim 1, wherein adding the training example information retrieval model annotation to the at least one training example further comprises adding the training example information retrieval model annotation to the at least one training example with at least one component of the natural language processing model.

8. The computer-implemented method of claim 1, wherein the prediction comprises at least one part-of-speech prediction.

9. A computer-implemented method performed by a data processing apparatus, the method comprising:
- generating a trained natural language processing model based on receiving natural language training on a training data set, wherein the training data set comprises a plurality of training examples, each training example comprising text, natural language processing tags, and information retrieval model annotations, the information retrieval model annotations being generated by an information retrieval model;
- wherein receiving natural language training on the training data set comprises:
  - extracting information retrieval features from one of the training examples in the training data set based on the information retrieval model annotations,
  - predicting a part-of-speech tag for at least one word in the training example,
  - generating a confidence score for the predicted part-of-speech tag, and
  - filtering the predicted part-of-speech tag if the confidence score is below a threshold;
- receiving a target document comprising text and at least one information retrieval model annotation, the at least one information retrieval model annotation being generated by the information retrieval model;
- generating a prediction and an additional confidence score for the prediction for at least one word in the text of the target document, wherein generating the prediction and the additional confidence score for the prediction comprises applying the text of the target document and the information retrieval model annotation to the trained natural language processing model to generate the prediction; and
- using the prediction in performing one or more further actions relevant to the target document.

10. The computer-implemented method of claim 9, wherein the target document is one of a search query and a potential search result.

11. The computer-implemented method of claim 9, further comprising increasing the confidence score for a mention-chunking prediction that corresponds to a mention-chunk identified by an information retrieval model annotation in the target document.

12. A system comprising: one or more computers and one or more storage devices storing instructions which are operable, when executed by the one or more computers, to cause the one or more computers to perform operations comprising:
- obtaining a training data set comprising at least one training example, the at least one training example being annotated with at least one training example natural language processing tag;
- adding a training example information retrieval model annotation to the at least one training example in the training data set to obtain an annotated training data set;
- training a natural language processing model on the annotated training data set to obtain a trained natural language processing model, wherein the operation of training comprises training the natural language processing model based on both the training example natural language processing tag and the training example information retrieval model annotation of the at least one training example;
- wherein training the natural language processing model on the annotated training data set comprises:
  - extracting information retrieval features from the at least one training example in the annotated training data set based on the information retrieval model annotation,
  - predicting part-of-speech tags for at least one word in the at least one training example,
  - generating a confidence score for the predicted part-of-speech tags, and
  - filtering the predicted part-of-speech tags if the confidence score is below a threshold;
- receiving a target document comprising text and at least one information retrieval model annotation; and
- generating, for at least one word in the text, a prediction and an additional confidence score for the prediction with the natural language processing model, wherein the operation of generating the prediction and the additional confidence score comprises using the information retrieval model annotation with the natural language processing model to generate the prediction.

13. The system of claim 12, wherein the target document is one of a search query and a potential search result.

14. The system of claim 12, wherein the at least one training example comprises text and wherein the at least one training example natural language processing tag comprises a part-of-speech tag.

15. A computer-implemented method performed by a data processing apparatus, the method comprising:
- generating a trained natural language processing model based on receiving natural language training on a training data set, wherein the training data set comprises a plurality of training examples, each training example comprising text, natural language processing tags, and information retrieval model annotations, the information retrieval model annotations being generated by an information retrieval model;
- receiving a target document comprising text and at least one information retrieval model annotation, the at least one information retrieval model annotation being generated by the information retrieval model;
- generating a prediction and a confidence score for the prediction for at least one word in the text of the target document, wherein generating the prediction and the confidence score for the prediction comprises applying the text of the target document and the information retrieval model annotation to the trained natural language processing model to generate the prediction;
- increasing the confidence score for a mention-chunking prediction that corresponds to a mention-chunk identified by an information retrieval model annotation in the target document; and
- using the prediction in performing one or more further actions relevant to the target document.

* * * * *